No. 618,382. Patented Jan. 24, 1899.
H. H. HARDY.
CARBURETER.
(Application filed Feb. 28, 1898.)
(No Model.) 2 Sheets—Sheet I.
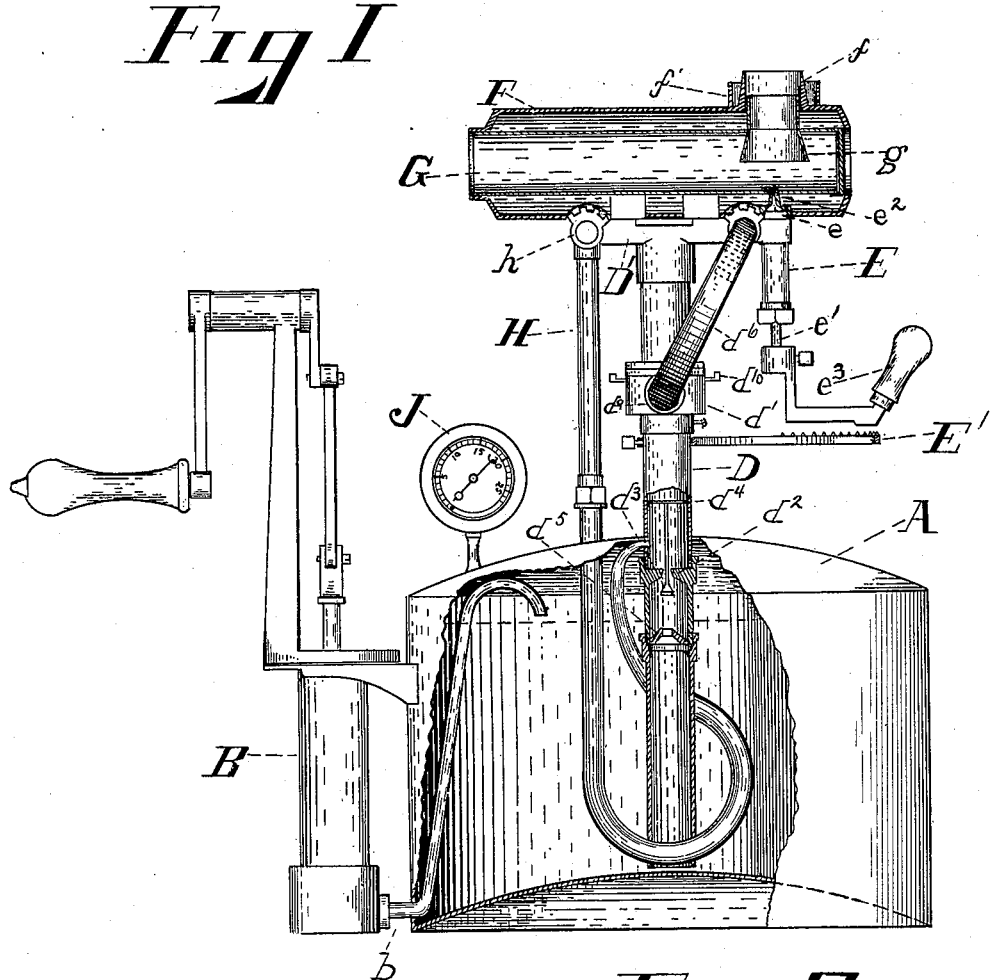
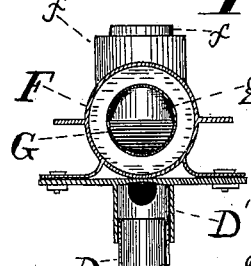

No. 618,382. Patented Jan. 24, 1899.
H. H. HARDY.
CARBURETER.
(Application filed Feb. 28, 1898.)
(No Model.) 2 Sheets—Sheet 2.
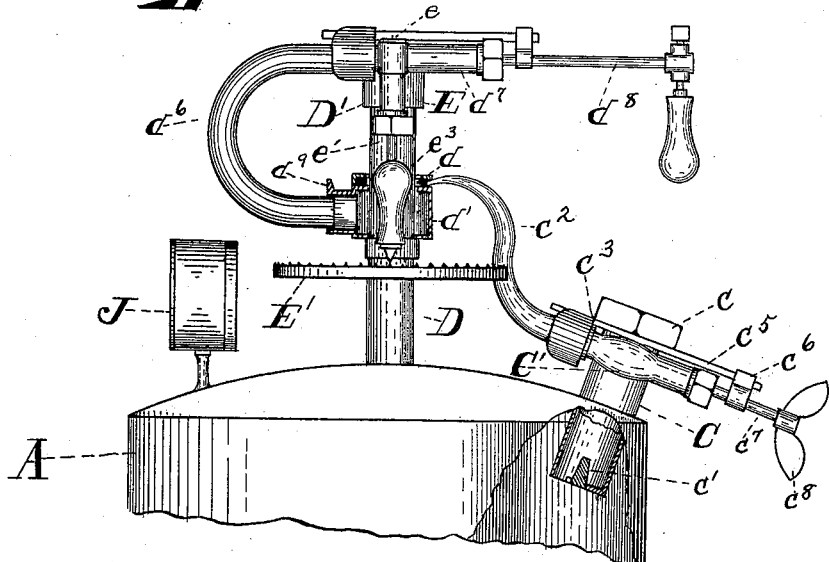
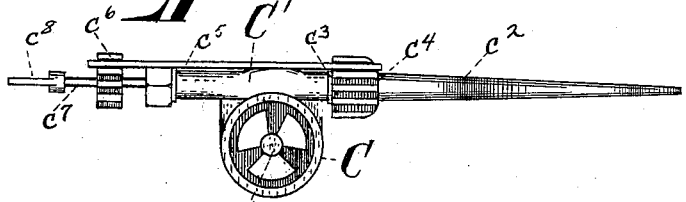
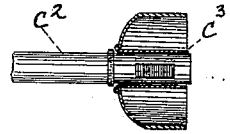
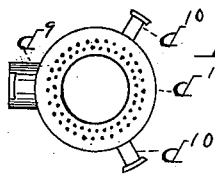
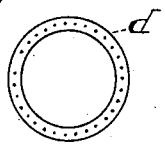
WITNESSES
Walter J. Murray
Emma Lyford
INVENTOR
Henry H. Hardy
By Geo. J. Murray
Atty

UNITED STATES PATENT OFFICE.

HENRY H. HARDY, OF COVINGTON, KENTUCKY.

CARBURETER.

SPECIFICATION forming part of Letters Patent No. 618,382, dated January 24, 1899.

Application filed February 28, 1898. Serial No. 671,890. (No model.)

*To all whom it may concern:*

Be it known that I, HENRY H. HARDY, a citizen of the United States, and a resident of Covington, in the county of Kenton and State of Kentucky, have invented certain new and useful Improvements in Carbureters, of which the following is a specification.

The object of my invention is a portable machine for producing gas for illuminating or heating purposes from gasolene, to be used principally for illuminating dwellings and commercial buildings and also for heating same.

The invention will be first fully described in connection with the accompanying drawings and then particularly referred to and pointed out in the claims.

Referring to the drawings, in which like parts are indicated by similar reference-letters wherever they occur throughout the various views, Figure 1 is a view, partly in front elevation and partly in section, of a machine embodying my invention. Fig. 2 is a detail view, in vertical transverse section through line $x\ x$ of Fig. 1, of the commingling-chamber. Fig. 3 is an elevation taken at right angles to the view shown in Fig. 1, with part of the tank broken away and other parts shown in axial section. Fig. 4 is a detail plan view, upon an enlarged scale, of the supply-tube for the tank and its connections, including the tube and its valves for supplying vapor to the subflame or initial vaporizer. Fig. 5 is a detail plan view of the subflame box or chamber. Fig. 6 is a detail view of the injector for supplying air mixed with vapor to the initial burner. Fig. 7 is a detail plan view of the initial vaporizing ring or chamber.

Referring to the parts, A represents the gasolene tank or reservoir, and B an air-pump of ordinary construction connected to the side of the tank and having its discharge-pipe $b$ passing through the tank near the bottom and projecting up above the liquid-line into what I term the "air" or "compression" chamber of the tank, the liquid-line being indicated by dotted lines, as shown in Fig. 1. Into one side of the tank-top is secured a filling-pipe C, which projects down a short distance into the tank and is closed by a screw-cap $c$. In the bottom of this pipe is an upwardly-projecting pin or stud $c'$, supported by spider-arms connected to the walls of the tube. The purpose of the stud or pin $c'$ is to open a valve in the filler can or tube when inserted in the filler-tube C and hold it open until the gasoline covers the lower end of the filler and shuts off the further supply of gasolene to the tank. The length of the tube $c$ thus determines the liquid-line.

Formed integral with the filler-tube C is the needle-valve case C', which communicates with the filler-tube and tank back of the needle-valve seat. To the forward end of this valve-case is secured the tube $c^2$, which communicates with the burner $d$, which surrounds the stand-pipe D above the subflame-box $d'$.

The tube $c^2$, which forms the continuation of the valve-case C', is longitudinally slotted at its end which connects to the valve-case C', and over the slotted portion is sleeved a tube $c^3$, which is also longitudinally slotted to register with the slots in tube $c^2$ when turned in the proper position to admit air to the tube $c^2$ and when turned to cover the slots in tube $c^2$ cut off communication of the air. The tube $c^3$ has a case or hood surrounding it, forming an air-chamber, and from the periphery of this case are notched segments $c^4$, which are connected by a bar $c^5$ with a cog-segment $c^6$, secured upon the stem $c^7$ of the needle-valve. The purpose of this arrangement is to admit air into the tube $c^2$, which is sucked through it by the pressure of the gas passing through the needle-valve when opened, and to cut off the supply of air simultaneously with the closing of the needle-valve. Thus when the stem $c^7$ of the needle-valve is rotated by the wing-nut $c^8$ to open communication between the tank and pipe $c^2$ the bar $c^5$ also rotates the sleeve $c^3$ and its hood, and when the wing-nut is turned in the opposite direction to close the valve the sleeve $c^3$ is rotated simultaneously with it to cut off air from the pipe $c^2$.

The stand-pipe D, which is open at both ends, extends down to near the bottom of the tank, projects through its top, and terminates at its upper end in a vaporizing-chamber, which consists of a hollow arm D', which is closed at both ends and has upon its under side a circular interiorly-screw-threaded flange to screw said chamber onto the upper end of said stand-pipe and to afford communication between said pipe and said chamber. This pipe, within the tank, is provided with a cone-shaped valve-seat $d^2$ and a valve $d^3$, the stem of which at its upper end is provided with a float $d^4$. Below the valve-seat is a cone-shaped spider $d^5$ to stop the valve $d^3$ before the float strikes the upper face of the seat. To the vaporizing-chamber D' is secured a valve-case E, and on top of it is the seat $e$ of the needle-valve, the stem $e'$ of which projects through the valve-case and controls the flow of gas through the nipple $e^2$, which projects through the hot-air chamber F and into the commingling tube or chamber G. To the opposite end of the vaporizing-chamber D' is secured a pipe H, which extends down into the tank to near the bottom and is coiled around the stand-pipe and communicates with it within the tank and between the valve-seat $d^2$ and float $d^4$, for the purpose hereinafter described. The hot-air cylinder F, which is secured upon top of the vaporizing-chamber D', has its perimeter slotted above the vaporizing-chamber and one end left open to admit air and afford access to the cap closing one end of the commingling-tube G, which is concentric with the air-chamber F. From the top of the air-chamber F extends a branch $f$ and surrounding it an annular flange or branch $f'$. The pipes leading through the building for supplying the gas are secured to the branch $f'$, thus leaving a space between the pipes and branch $f$, which extends but a short distance above the ring $f'$ to equalize the pressure of the gas passing to the pipes of the building.

Within the commingling-chamber G is an inverted funnel $g$, located axially above the nipple $e^2$. The gas passing under high pressure through the nipple sucks the hot air which passes through the open end of the tube G and is heated by the air in the jacket surrounding the tube, commingled with the gas in the funnel $g$, and thoroughly mixed in the pipe connected to the branch $f'$ before it reaches the burners. The amount of gas supplied to the pipes through the branch $f$ is regulated by the needle-valve $e'$, which has a handle $e^3$, secured to the needle-valve stem, the horizontal arm of which projects over a graduated sector E', which is secured to the stand-pipe D and has numbered detents projecting up from it, the numbers corresponding with the number of lights it is desired to use, so that when the handle is turned over the graduator E' and stopped above either one of its numbered detents the requisite quantity of gas will be furnished for the number of burners indicated on the sectors below the horizontal arm of the handle.

The subflame-box $d'$, which is sleeved over the stand-pipe D, is connected to the vaporizing-chamber D' by a pipe $d^6$, the connection being by the same means as described for connecting the pipe $c^2$ to the initial burner $d$. The valve-chamber $d^7$ is the same as the valve-chamber C', and the end of the pipe $d^6$, connecting it with the subflame-box $d'$, is of the same form as shown in Fig. 6, so that when the valve-stem $d^8$ is turned to open the needle-valve to any extent the sleeved injector is also turned to admit the requisite amount of air to commingle with the gas from the vaporizing-chamber to the subflame-box, which passes through the perforations in the top of the subflame-box, as shown in Fig. 5, and heats the vaporizing-chamber to the degree desired. The branch $d^9$ has an upwardly-projecting lug at its outer end corresponding to the lugs or supports $d^{10}$, which project out from the sides of the subflame-box $d'$. The purpose of this is to support a chimney, if it is desired to use one, to concentrate the heat under the vaporizing-chamber D'. The pipe H, communicating with the vaporizing-chamber, is also open, so that any excess of pressure in the chamber is carried down through the pipe, passes through the liquid in the tank A, assists in heating it, and being cooled in its passage is reconveyed into the stand-pipe, as shown.

Ordinarily the liquid in the stand-pipe D is below the top of the tank; but should the pressure from any cause in the air or pressure chamber above the liquid be so great as to carry the liquid up through the stand-pipe above the top of the tank the liquid would carry the float $d^4$ up, close the valve $d^3$ upon its seat, and stop the further passage of vapor to the vaporizer until the pressure was reduced sufficiently to allow the valve to open.

When the tank is filled for use up to the bottom of the filler-tube, the air-pump is operated until the gage J shows a pressure of about ten pounds. The valve in case C' being open, the pressure will be sufficient to force the gasolene mixed with air into the initial burner $d$, which is ignited and kept burning until the heat raises the vapor in the stand-pipe and the vaporizing-chamber to a pressure sufficient to force it through the pipe $d^6$ into the subflame-box $d'$, whence, issuing through perforations in the top thereof, it is ignited by the flame of the initial burner, when the valve to the initial burner is closed and the supply of gas will be continuous until all the gasolene in the tank is exhausted. I have found by experience that when the machine is once started after a pressure of ten pounds has been forced above the gasolene the heated vapor passing down through pipe H and heating up the liquid in the tank will keep up the pressure in the tank until the whole of the gasolene is exhausted without the aid of the pump to keep up pressure sufficient to force the gas through the pipes in the building.

I have indicated at $h$ a connection, similar to the one shown for supplying gas to the initial burner and to the subflame-box, which may be employed for conveying the heated vapor to a stove or other heating apparatus, if desired, instead of permitting the whole of it to flow down through the pipe H to heat the liquid in the tank.

What I claim as new is—

1. In a gas-machine such as described the combination of the tank, the air-pump connected thereto and having its discharge near the top thereof, the stand-pipe having its receiving end near the bottom of the tank and its upper end terminating in a vaporizing-chamber, the hot-air chamber secured upon the vaporizing-chamber and having branches to connect to the main supply-pipe and pass the gas to said pipe, the commingling tube or chamber within said air-chamber, the tube or funnel to receive air and gas, commingle them and pass them to the supply-pipe, the initial burner below the vaporizing-chamber, and suitable valves such as shown to control the flow of gas to the initial burner and from the vaporizing-chamber.

2. In a gas-machine the combination of the gasolene-tank, the stand-pipe centrally secured therein, having its receiving end near the bottom of the tank, its upper end terminating in a vaporizing-chamber, said vaporizing-chamber, a float-controlled valve within said stand-pipe, the initial and subflame box sleeved over said stand-pipe below the vaporizing-chamber, the filler-tube passing through the top of the tank near the side wall thereof and extending down into the tank, the air-pump connected to the side of the tank and having its discharge near the top thereof, the supply-valve for the initial burner connected to the filler-tube and having at the forward end of its case a slotted tube communicating with the initial burner, the air-inlet sleeved over the slotted end of said gas-supply tube slotted to register with the slots in the tube and connected to the stem of the needle-valve to admit air simultaneously with the opening of said valve to the initial burner, a similar valve, air-inlet and tube between the subflame-box and vaporizing-chamber, a hot-air chamber secured upon said chamber and having upwardly-projecting branches, to connect with supply-pipes for the building and convey the commingled gases from the air-supply tube and vaporizing-chamber to said pipes, the air-supply tube within said chamber, leaving a jacketed space between it and the walls of the hot-air chamber, and a valve to control the supply of gases from the vaporizing-chamber to the commingling-tube, substantially as shown and described.

3. In a gas-machine the combination of the tank, the stand-pipe secured therein having its supply end near the bottom of the tank, a vaporizing-chamber on the upper end of said stand-pipe, a float-controlled valve within the stand-pipe, a subflame-box and initial burner above it having their tops perforated, said box and burner being sleeved over the stand-pipe below the vaporizing-chamber, the hot-air tube and commingling-tube secured upon the vaporizer, the branches for connecting the commingling-tube and hot-air tube with the gas-supply pipes for the building, a needle-valve and case communicating with the filler-tube and the initial burner, a similar tube having a controlling-valve communicating with the vaporizer and subflame-burner, an air-pump connected to the tank and having its discharge above the lower end of the filler-tube to force the gasolene over to the initial burner or the vaporizer, a pipe from the vaporizer passing down into the tank coiled around the stand-pipe and communicating with it above the float-controlled valve, a needle-valve to control the supply of gas from the vaporizer to the commingling-chamber, said valve-stem having an angle-arm for opening or closing the valve, and an indicator below the angle-arm of the valve-stem to determine the amount of gas-supply from the vaporizing-chamber to the commingling-chamber, substantially as shown and described.

HENRY H. HARDY.

Witnesses:
GEO. J. MURRAY,
EMMA LYFORD.